United States Patent [19]

Yamazaki et al.

[11] Patent Number: 4,999,709
[45] Date of Patent: Mar. 12, 1991

[54] APPARATUS FOR INSERTING TITLE PICTURES

[75] Inventors: Hiroshi Yamazaki, Kanagawa; Sakae Okazaki, Tokyo, both of Japan

[73] Assignee: Sony Corporation, Tokyo, Japan

[21] Appl. No.: 299,063

[22] Filed: Jan. 19, 1989

[30] Foreign Application Priority Data

Jan. 27, 1988 [JP] Japan ................... 63-14554

[51] Int. Cl.⁵ .................... H04N 5/14; G09G 1/06
[52] U.S. Cl. ..................... 358/160; 358/22; 358/183; 340/724; 364/521
[58] Field of Search ............. 358/21 R, 22, 160, 183; 340/724; 364/521

[56] References Cited

U.S. PATENT DOCUMENTS

| 4,334,245 | 6/1982 | Michael | 358/183 |
| 4,533,952 | 8/1985 | Norman, III | 358/160 |
| 4,613,906 | 9/1986 | Tanaka et al. | 358/183 |
| 4,766,427 | 8/1988 | Abe et al. | 340/724 |
| 4,800,423 | 1/1989 | Appiano et al. | 358/21 R |
| 4,873,514 | 10/1989 | Nakagawa et al. | 340/724 |
| 4,922,238 | 5/1990 | Aoki et al. | 340/724 |

Primary Examiner—John W. Shepperd
Assistant Examiner—Michael D. Parker
Attorney, Agent, or Firm—Alvin Sinderbrand; William S. Frommer

[57] ABSTRACT

Apparatus for superimposing graphic title image signals onto an input video signal to produce a video picture having graphics, such as title images, superimposed thereon. Graphic title image data is written into a memory and subsequently is read out under the control of an address generator whose read-out addresses are shifted at a given repetition rate to change the positioning of the graphic title image data relative to the video signal, thereby producing a scrolling effect of the graphics across an image plane.

28 Claims, 8 Drawing Sheets

APPARATUS FOR INSERTING TITLE PICTURES

BACKGROUND OF THE INVENTION

1 Field of the Invention

This invention relates to apparatus for superimposing graphic title image signals (or other graphics) onto a video signal and for causing such superimposed images to scroll across the video picture derived from the video signal This invention finds ready application in so-called video titlers and telopers (or opaque projectors) and is particularly useful with video cameras of the type having an image pick-up device and a video tape recorder (VTR) housed within the same housing.

1. Description of Background Art

Apparatus for superimposing graphic title images onto video signals have been developed as peripheral equipment for use with VTR's. Such graphic title images, referred to generally as graphics, are used in video dubbing to superimpose, or insert, graphic data onto a recorded video signal. As a result, a composite video signal containing graphic information is recorded. Such peripheral equipment is known to the prior art as titlers or telopers for dubbing graphic information, usually titles, onto the recorded video signals.

Typical of such graphic inserting equipment are character generators which are capable of generating various types of alphanumeric patterns. The patterns formed by such character generators appear as title image signals and are superimposed onto video signals that are reproduced from the VTR or that may be derived from an image pick-up device. However, such character generators usually are not suited for integration with presently available video cameras. A conventional video camera is a hand-held device containing a VTR and an image pick-up section within the same housing. Character generators usually are too large, too heavy and too expensive to be integrated into such video cameras.

It has been proposed to provide video cameras with the capability of inserting graphics, such as graphic title image data, into the video signals generated by the image pick-up section. One suggestion is to use the image pick-up section to image graphics which, for example, may be drawn on a screen, poster, placard, or the like, thereby generating video signals corresponding to the imaged graphics, and then storing this graphic data in a suitable memory provided in the video camera. Thereafter, the stored graphic data may be read from the memory and superimposed onto the video signal then being generated by the image pick-up section (such as the video signal representing a scene being "photographed" by the image pick-up section). The video signal then being imaged, together with the superimposed graphic data may be recorded by the VTR section of the video camera.

The graphic insertion proposal of the type just described writes graphic data into the memory on a line-by-line basis, with each line generally being divided into several image units, analogous to pixels. The location of the graphic data that is read from the memory, relative to a picture image plane, is, of course, substantially identical to the location of that graphic data when it was written into the memory. Thus, if graphic material occupied the center portion of the image plane when it was written into the memory, the graphics read from the memory and superimposed onto an input video signal likewise will occupy the center portion of the image plane. Similarly, original graphics data disposed at the bottom or top of the image plane when written into the memory will occupy the bottom or top of that same image plane when read. Likewise, graphics data located to the left or right of the image plane when written will be superimposed to the left or right of the image plane when read. Thus, the particular position of the graphic data that is imaged by the pick-up section remains fixed when that graphic data subsequently is superimposed onto another video signal imaged by the pick-up section. The user of the video camera is provided with limited flexibility in adjusting the position of the graphic data after that data has been imaged and stored in the memory. Accordingly, a noted drawback of graphic insertion apparatus of the type described above is that the graphic data that is stored in the memory cannot subsequently be scrolled horizontally or vertically, relative to a video picture, or video image plane.

OBJECTS AND SUMMARY OF THE INVENTION

Therefore, it is an object of the present invention to provide apparatus for inserting graphic data into an input video signal, while providing a scrolling effect to that graphic data so that it may be moved across an image plane.

Another object of this invention is to provide apparatus for superimposing graphic title image signals onto an input video signal which overcomes the aforenoted drawbacks and disadvantages.

A further object of this invention is to provide apparatus for storing graphic title image data and then reading out that data to be superposed onto a video signal, while enabling an operator to scroll that data horizontally and/or vertically with respect to a video picture derived from that video signal.

Various other objects, advantages and features of the present invention will become readily apparent from the ensuing detailed description, and the novel features will be particularly pointed out in the appended claims.

In accordance with this invention, apparatus is provided for superimposing graphic title image signals onto an input video signal. Graphic title image data is stored in an addressable store and is read out therefrom in response to address signals generated by an address generator. The data read from the store are used to generate graphic title image signals which are superimposed onto the input video signal. An address control is coupled to the address generator for establishing an effective image range of addresses to define an effective picture area (or image range) of a video picture derived from the graphic title image data. The sequence of the address signals relative to the effective range of addresses is selectively shifted by a predetermined number of addresses for every m repetition periods (m is an integer and a repetition period is either a vertical field or a vertical frame) by an address shifter. The graphic title image data read from the store at intervals within the effective image range determined by the shifted address signals are gated for superposition onto the input video signals and, as a result, the video picture derived from the graphic title image data represents a shifting graphic title image.

In the preferred embodiment of this invention, graphic title image data generated by an image pick-up device is written into an addressable memory under the control of horizontal and vertical address generators. Preferably, addresses representing discrete locations in successive horizontal lines are limited to those addresses which define an effective image plane, that is, an effective picture area. Subsequently, the same horizontal and vertical address generators are used to read out the graphic title image data from the stored locations within memory. An output circuit, which functions as a gate, is enabled (or opened) at times corresponding to the effective image plane, thereby gating the read-out graphic title image data to circuitry which functions to superimpose the read-out data onto an input video signal.

Preferably, switches are selectively operated by a user to produce a horizontal and/or vertical scroll effect to the read out graphic title image data. This is achieved by shifting the horizontal addresses generated by the horizontal address generator by a predetermined amount during each horizontal line interval to effect a horizontal scroll; and by shifting the vertical addresses generated by the vertical address generator by another predetermined amount during every m field or frame intervals (m is an integer) to effect a vertical scroll of the graphic title image data. As an example, let it be assumed that of the 525 line intervals normally included in an NTSC video frame, approximately 480 lines define the effective picture area, or image plane Vertical addresses 0, 1, 2, . . . 479 are generated in synchronism with the usual horizontal synchronizing signal, such that address 0 is generated when, for example, the horizontal sync signal representing line 20 is present. To effect a vertical scroll, the vertical address may be shifted such that, when line 20 of the conventional video frame is present, the vertical address generator may be preset to a count of 2. This, of course, means that the graphic title image data that may have been stored at addresses 0 and 1 in the memory are not read or, alternatively, if read are not gated out for superposition. Then, m frames later, at line 20 of the conventional video frame, the vertical address generator may be preset to a count of 4. Now, the graphic title image data stored at vertical addresses 0, 1, 2 and 3 are not gated out for superposition. As this process continues, the graphic title image data superposed onto the video signal and eventually displayed appears to scroll vertically.

A similar operation is carried out with the horizontal address generator, thereby achieving a horizontal scrolling effect to the graphic title image data.

Thus, by shifting the horizontal and vertical addresses within the effective image address range (that is, within the range of addresses which define the picture area), stored graphic title image data may be read out in time-shifted relationship to a field or frame interval, thereby shifting the position of the superposed graphic title image data on the video signal which, in turn, shifts the position at which the graphic title image data is displayed on the video picture. By shifting the addresses periodically, such as by a predetermined amount every m fields or frames, the displayed graphic title image information appears to scroll horizontally or vertically across the video picture.

As an advantageous feature of this invention, the graphic title image data is modulated with color signals (R, G, B) to produce, for example, red, green or blue graphic title image data; and the color graphic data is converted to luminance and color difference signals for superposition onto the input video signal (which, preferably, is itself a composite color video signal).

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
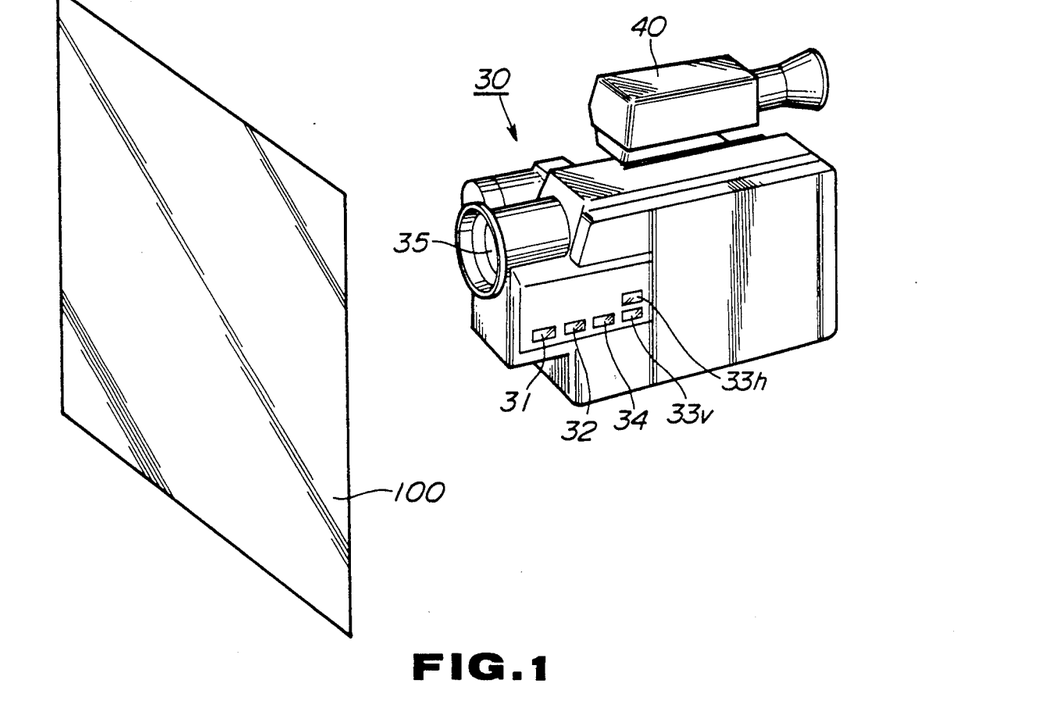
FIG. 1 is a perspective view of a video camera which incorporates the present invention.

The present invention will be described in the environment of a video camera having an image pick-up section and a VTR section, whereby an image that is picked up by the pick-up section is recorded as a video signal on the VTR section. The present invention is used in the video camera to superimpose graphics, such as graphic title image signals, onto the video signals picked up by the pick-up section and recorded by the VTR section. FIG. 1 is a perspective view of a video camera which, in one embodiment, includes a VTR section for recording video signals in the 8 mm format.

As shown, video camera 30 includes an imaging lens 35 and a photosensitive target, described in greater detail below, on which a scene imaged by lens 35 is projected. The photosensitive device, described herein as a charge coupled device (CCD) is a conventional image sensor used in video cameras to generate video signals. The video signals derived from the CCD and corresponding to the scene which is imaged by lens 35 is displayed as a television picture in an electronic view finder 40.

The video camera also includes a series of switches 31–34 that are manually operable and used for superimposing graphic title image signals onto the video signal generated by the CCD as a scene is imaged. Briefly, switch 31 is adapted, when actuated, to store graphic title image data in a memory included within video camera 30. Typically, such graphic title image data is produced by using video camera 30 to image graphic information provided on a poster, placard or the like. FIG. 1 illustrates a placard 100 having graphic information thereon which is picked up by video camera 30. A schematic representation of graphic information is depicted at 101 in FIG. 4. As will be described, digital representations of the video signals generated by imaging placard 100 are written into the aforementioned memory when switch 31 is actuated. Switch 32 is adapted, when actuated, to read out the graphic title image data stored in the aforementioned memory and to supply that data to circuitry for conversion into video signals compatible with the video signals produced by the CCD when video camera 30 is used to image a scene. These graphic video signals are superimposed onto the video signals which then are being picked up by the video camera.

Switches 33h and 33v are adapted, when actuated, to effect horizontal and vertical scrolling, respectively, of the graphic video signals relative to the input video signal then being picked up by video camera 30. As an example, when switch 33h is actuated, the graphic title image signals scroll horizontally such that a video picture that may be derived from the graphic title image signals appears to move horizontally across the picture area. Likewise, the actuation of switch 33v effects a vertical scrolling of the graphic title image signals relative to the video signals picked up by the video camera. As a result, a video picture derived from the graphic title image signals appears to scroll in the vertical direction. The manner in which this horizontal and vertical scrolling is achieved is described below.

Finally, switch 34 is adapted, when actuated, to select a particular color representation for the graphic title image. For example, switch 34 may select red, green or blue (R, G, B) color signals to modulate the graphic title image data read from the memory, thereby presenting the graphic data as red, green or blue image data. As one example, successive actuations of switch 34 serves to cycle the selected R, G, B signal for modulating the graphic title image data. Still further, switch 34 may be actuated to select composite R, G, B signals to modulate the graphic title image data, thereby resulting in a white graphic display. It is contemplated that combinations of RGB signals may be selected. Preferably, color modulation is carried out only when the graphic title image data is read from the memory and supplied to the superposition circuitry, to be described.

Figure 2:
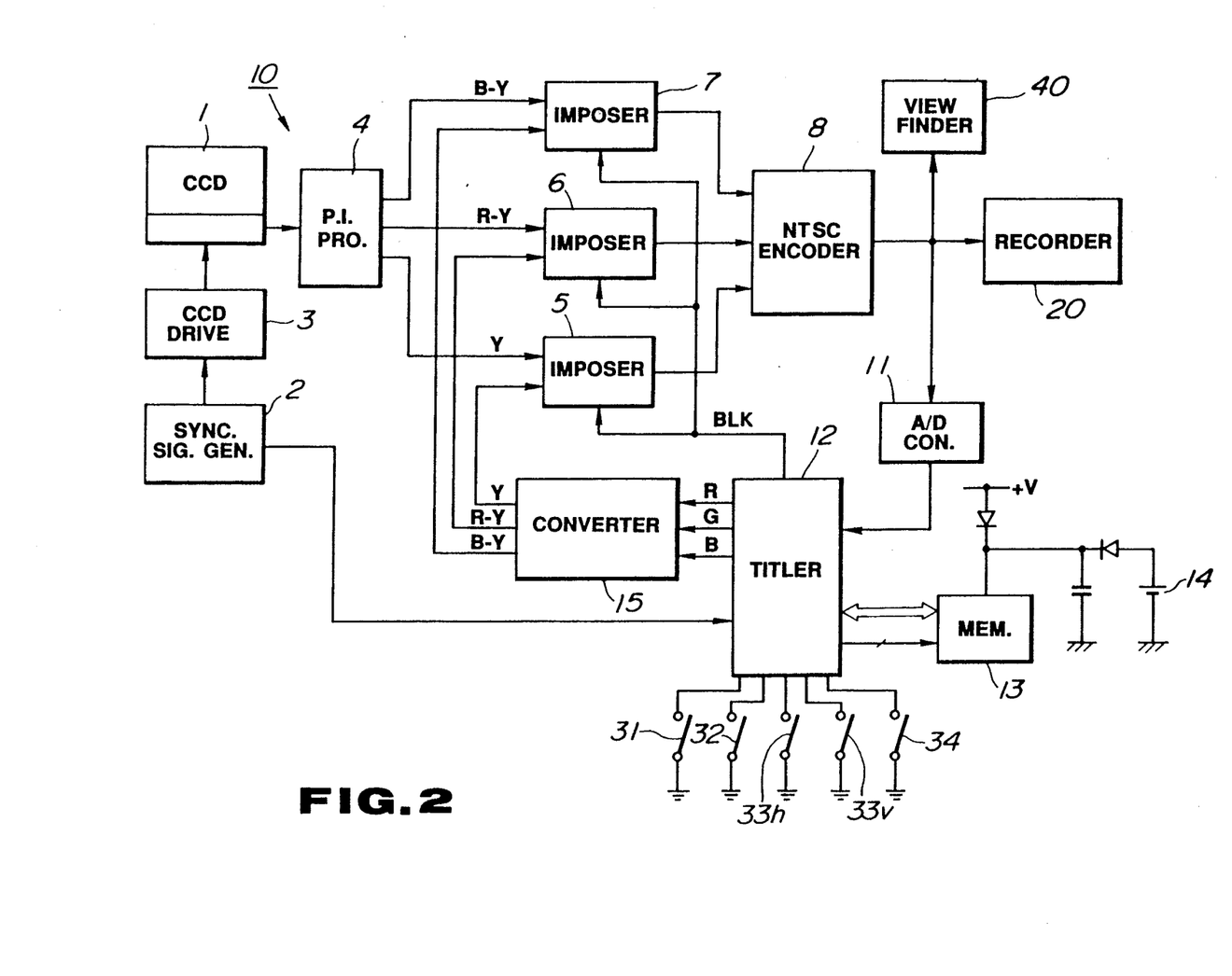
FIG. 2 is a block diagram of primary components included in the video camera, including the present invention.

Turning now to FIG. 2, there is illustrated a block diagram of some of the primary components included in video camera 30, including those components used to produce and superpose graphic title image signals onto an input video signal. Here, image pick-up section 10 is comprised of a CCD target 1, a synchronizing signal generator 2, a CCD drive circuit 3 and an image processing circuit 4. FIG. 2 also illustrates a VTR 20 and an electronic view finder 40. As mentioned above, CCD 1 is a conventional photosensitive image pick-up device which, typically, is driven (or scanned) by CCD drive 3 under the control of horizontal and vertical synchronizing signals generated by synchronizing signal generator 2. As a result, signals are derived from CCD 1 representative of an optical image projected thereon. These image signals are processed by image signal processing circuit 4 to produce conventional luminance and color difference video signals. Luminance signal Y and color difference signals (R-Y) and (B-Y) are supplied to an NTSC encoder 8 by way of superposing circuits 5, 6 and 7, respectively, for the purpose of generating a conventional NTSC encoded composite video signal. The NTSC-encoded video signal is supplied to VTR 20, whereat it is recorded, and to view finder 40, whereat a video picture corresponding to the NTSC-encoded video signal is displayed. It will be appreciated that elements 1-4, encoder 8, VTR 20 and view finder 40 are conventional.

Superposition circuits 5, 6 and 7 are adapted to superpose onto the video signals supplied thereto by image processing circuit 4 graphic title image signals derived from what is referred to herein as titler apparatus 12, the subject matter of the present invention. Titler 12 includes a blanking signal output BLK together with R, G, B signal outputs the latter being coupled to a converting circuit 15. The converting circuit is adapted to convert R, G, B signals to conventional luminance and color difference signals compatible with the luminance and color difference signals produced by image processing circuit 4. As shown, luminance signals Y from image processing circuit 4 and from converter 15 are coupled to superposition circuit 5. Red color difference signals (R-Y) are supplied to superposition circuit 6 by the image processing circuit and by the converter. Finally, blue color difference signals (B-Y) are coupled by the image processing circuit and the converter to superposition circuit 7. The superposition circuits may be thought of as switching circuits which normally pass the video signal components supplied thereto from image processing circuit 4. However, in the presence of a blanking signal BLK from titler apparatus 12, the superposition circuits pass the video signal components then being supplied by converter 15. Hence, portions of the video signal derived from CCD 1 are replaced by graphic title image signals then being provided by titler apparatus 12.

The titler apparatus is coupled to switches 31-34, described generally above and explained in further detail below, for the purpose of controlling write and read operations, horizontal and vertical scroll operations and color selection of the graphic title image data. In addition, the titler apparatus is coupled to an analog-to-digital (A/D) converter 11 which, in turn, is coupled to the output of NTSC encoder 8. The A/D converter is adapted to quantize the video signal produced by NTSC encoder 8, and particularly the luminance component therein, when video camera 30 is used to image graphic information provided on placard 100. In one embodiment, when the luminance signal level Y exceeds a predetermined threshold level, A/D converter 11 supplies a binary "0" to titler apparatus 12. When the luminance signal level Y is less than this threshold, the A/D converter provides a binary "1" to the titler apparatus. If graphic images 101 (FIG. 4) are provided on a white background, a "1" produced by A/D converter 11 represents the presence of such graphic material.

Although A/D converter 11 is described herein as a one-bit converter, it will be appreciated that the A/D converter may be formed as a multi-bit converter.

Titler apparatus 12 also is coupled to a memory 13 which, in the preferred embodiment, is formed as a static random access memory (RAM). Graphic title image data produced by the titler apparatus in response to A/D converter 11 thus may be stored in memory 13 for prolonged periods of time. To prevent destruction of such data in the event that the main power supply of video camera 30 is interrupted, a back-up power supply having a lithium cell 14, or other long-term, low power drain battery, is coupled to the memory. Although not shown herein, it will be appreciated that the voltage produced by lithium cell 14 is monitored by a voltage reduction detection circuit to provide a suitable alarm when the power level of the lithium cell is reduced to some predetermined limit. Thus, the lithium cell may be replaced before its voltage output is reduced to a level by which graphic title image data stored in memory 13 is lost.

Briefly, in operation, placard 100 having graphic material 101 thereon is imaged by video camera 30. An image of this graphic material, preferably written on a white background, is projected onto CCD 1; and luminance and color difference signals representing that image are produced by image processing circuit 4. The luminance and color difference signals are encoded as a conventional NTSC video signal by encoder 8; and A/D converter 11 converts this analog video signal to a succession of "1" and "0" bits on a line-by-line manner. It will be appreciated that a typical line interval converted by A/D converter 11 may appear as follows: 0001111 . . . 1000111000 . . . 0.

If switch 31 is actuated, each line of digital information produced by A/D converter 11 is stored at corresponding locations in memory 13. In one embodiment, if A/D converter 11 generates k bits over an entire line interval, for example, if a line interval is divided into k discrete image areas analogous to k pixels, memory 13 may be provided with a number of rows, each row representing a line interval, with each row containing k storage locations. Alternatively, memory 13 may be provided with a number of rows equal to the number of line intervals included in a video picture, with each storage location in a row being formed as an 8-bit store. In any event, the graphic title image data produced by A/D converter 11 is stored in memory 13 on a row-by-row basis, with each row corresponding to a horizontal line interval.

Once graphic title image data is stored in memory 13, the user of video camera 30 now may operate that camera to image any desired scene. The imaged scene is projected on CCD 1; and image processing circuit 4 converts the projected image to luminance and color difference signals. These signals are encoded by NTSC encoder 8 and displayed on electronic view finder 40. If the user wishes, such video signals also may be recorded by VTR 20.

If the user now wishes to superimpose the graphic title image information stored in memory 13 onto the video signals which are being produced by the image processing circuit, switch 32 is actuated to read out from the memory the stored graphic title image data. This graphic title image data is read out in synchronism with the usual horizontal and vertical synchronizing signals and, thus, is synchronized with the video signals being produced by the image processing circuit. Depending upon the particular color selection made by actuating switch 34, the read out graphic title image data is modulated to produce an RGB signal, and converter 15 converts the RGB signal to luminance and color difference signals corresponding thereto. These luminance and color difference video signals representing the graphic title image are supplied to superposition circuits 5, 6 and 7 which replace portions of the input video signals supplied by image processing circuit 4 with portions of the graphic title image signals that occupy the same position in the overall video picture. Thus, graphic title image signals are superimposed onto the input video signal and the superimposed signals are displayed in electronic view finder 40. Such graphic information superimposed onto the scene picked up by video camera 30 may be recorded on VTR 20.

Additionally, if switch 33h or switch 33v is actuated, the superimposed graphic title image signals are scrolled horizontally or vertically, respectively, relative to the video signal upon which they are superimposed. Such horizontal and vertical movement appears in the video picture displayed by electronic view finder 40 and recorded by VTR 20.

Figure 3:
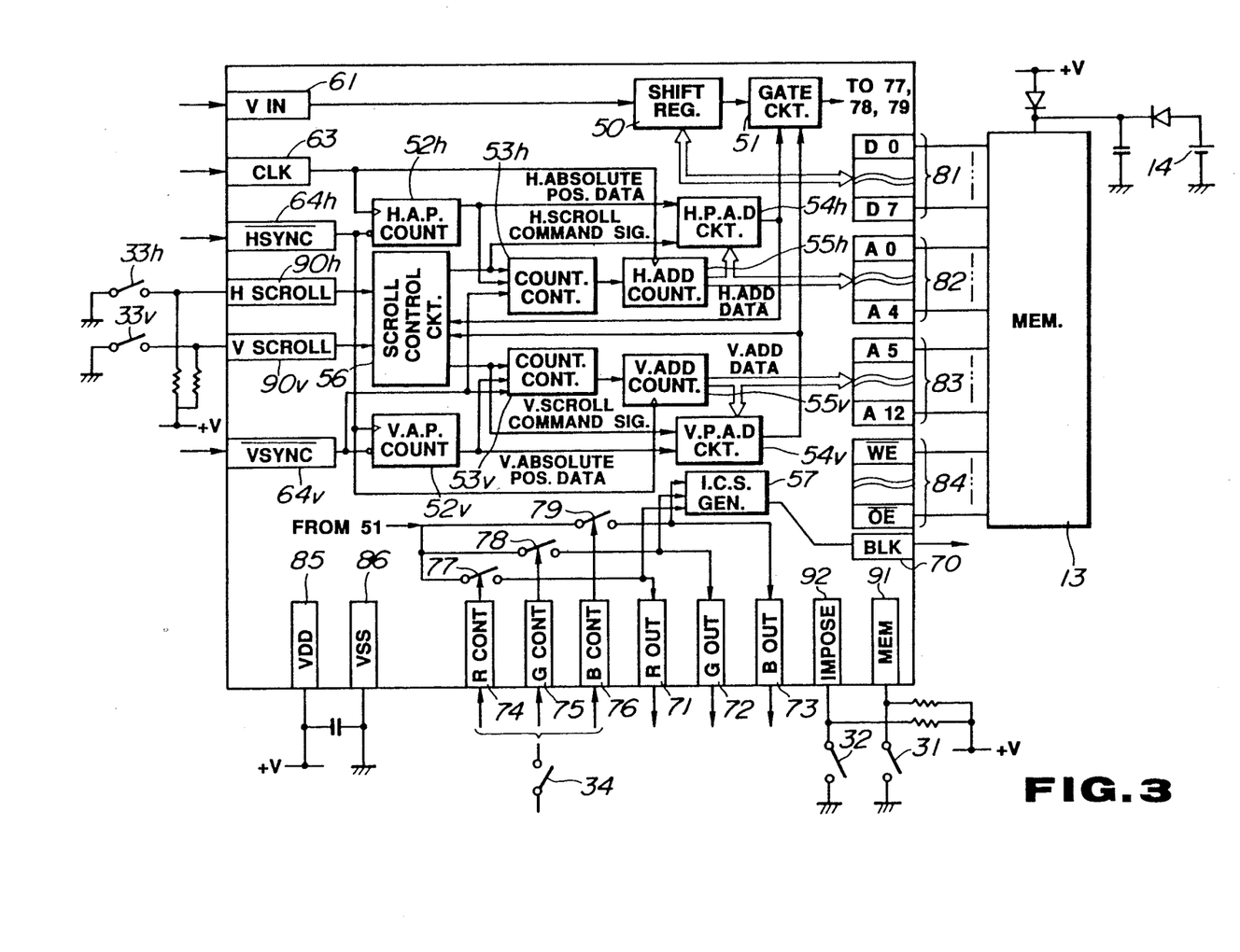
FIG. 3 is a block diagram of apparatus in accordance with the present invention.

A preferred embodiment of titler apparatus 12 now will be described with reference to the block diagram shown in FIG. 3. In the illustrated embodiment, the titler apparatus includes horizontal and vertical absolute position counters 52h and 52v, horizontal and vertical counter control circuits 53h and 53v, horizontal and vertical address counters 55h and 55v, horizontal and vertical image range defining circuits 54h and 54v, a scroll control circuit 56, a shift register 50 and a gate circuit 51. Shift register 50 is coupled to a video input terminal 61 and is adapted to receive the quantized video signal produced by A/D converter 11 (FIG. 2). The shift register is adapted to convert the serial bits received from the A/D converter to parallel form; and a parallel output of shift register 50 is coupled to a data output port 81 connected to memory 13. The shift register also includes a serial output coupled to gate circuit 51, the latter having enable inputs coupled to horizontal image range defining circuit 54h and vertical image range defining circuit 54v. The gate circuit is adapted, upon receiving enable signals from both image range defining circuits, to pass serial bits supplied from shift register 50 to output terminals 71, 72 and 73, to be described, and to a superimpose control signal generator 57 by way of selectively operated switches 77, 78 and 79.

Horizontal absolute position counter 52h is formed as a resettable counter having a clock input coupled to a clock terminal 63 and a reset input coupled to a horizontal synchronizing signal input terminal 64h. A suitable source of clock pulses (not shown) is coupled to clock input 63 to supply clock pulses of a frequency which divides a horizontal line interval into multiple discrete zones, analogous to multiple pixels. Horizontal synchronizing signal input terminal 64h is coupled to synchronizing signal generator 2 (FIG. 2) to receive the horizontal synchronizing signals generated thereby. Thus, horizontal absolute position counter 52h is reset at the beginning of each horizontal line interval and then is incremented by the clock pulses supplied thereto throughout that line interval. Hence, the count of the horizontal absolute position counter represents a position along the horizontal line interval. The output of counter 52h is coupled to horizontal counter control circuit 53h and also to horizontal image range defining circuit 54h, as will be described.

Similarly, vertical absolute position counter 52v includes a clock input coupled to horizontal synchronizing signal input terminal 64h and a reset input coupled to vertical synchronizing signal input terminal 64v. Counter 52v is adapted to be reset in response to each vertical synchronizing signal supplied to terminal 64v; and it will be appreciated that terminal 64v is coupled to synchronizing signal generator 2 (FIG. 2) to receive the vertical synchronizing signals generated thereby. The vertical absolute position counter is adapted to count horizontal synchronizing signals; and it is seen that the count of counter 52v represents a vertical position (or line number) in a video field interval. The count produced by counter 52v is coupled to vertical counter control circuit 53v and to vertical image range defining circuit 54v, as will be explained below.

Horizontal address counter 55h is adapted to produce a count defining the effective horizontal image range of a video picture. It is appreciated that the effective horizontal image range is less than the interval between adjacent horizontal synchronizing signals. Whereas horizontal absolute position counter 52h provides a count representing a position at any point between horizontal synchronizing signals, horizontal address counter 55h is adapted to provide a count representing a point within the left-right borders of the picture area. The horizontal address counter includes a clock terminal coupled to clock input 63 and a control input coupled to horizontal counter control circuit 53h. The count produced by the horizontal address counter functions as an address and is coupled to horizontal address port 82 for addressing horizontal storage locations in memory 13. This address count also is supplied to horizontal image range defining circuit 54h and is used to produce the horizontal enabling signal supplied to gate circuit 51.

Vertical address counter 55v is similar to horizontal address counter 55h in that it is adapted to count horizontal synchronizing signals supplied to horizontal synchronizing signal input terminal 64h to provide a count within the effective vertical image range. That is, the count of address counter 55v is within the top and bottom borders of a video picture area. A control input of vertical address counter 55v is coupled to vertical counter control circuit 53v. The count produced by the vertical address counter is coupled to vertical address port 83 and is used to address vertical storage locations of memory 13. This vertical address count also is supplied to vertical image range defining circuit 54v and is used to produce the vertical enabling signal supplied to gate circuit 51.

Horizontal counter control circuit 53h is adapted to preset horizontal address counter 55h to a predetermined count when the count attained by horizontal absolute position counter 52h reaches a previously determined amount. The horizontal counter control circuit thus includes an input coupled to the output of horizontal absolute position counter 52h. In addition, the horizontal counter control circuit is adapted to count the vertical synchronizing signal to detect a count m, as will be described. Accordingly, a suitable input of the horizontal counter control circuit is coupled to vertical synchronizing signal input terminal 64v. Finally, horizontal counter control circuit 53h includes a control input coupled to scroll control circuit 56 for modifying the particular horizontal absolute position count which is detected by the horizontal counter control circuit for presetting horizontal address counter 55h, or for changing the preset count. As will be explained below, if the presetting of the horizontal address counter changes relative to the horizontal absolute position count, or if the count to which the horizontal address counter is preset is changed, the period during which the horizontal address counter lies within the effective horizontal image range also varies, thereby varying the duration that gate circuit 51 remains open. This, in turn, provides an horizontal scrolling effect to the graphic title image data read from memory 13 and passed by gate circuit 51.

Vertical counter control circuit 53v is similar to horizontal counter control circuit 53h and is adapted to preset vertical address counter 55v when the position count reached by vertical absolute position counter 52v reaches a previously determined count. Accordingly, a control output of vertical counter control circuit 53v is coupled to a preset input of vertical address counter 55v. The vertical counter control circuit is adapted to count vertical synchronizing signals and, therefore, an input is coupled to vertical synchronizing signal input terminal 64v. Finally, a control input of vertical counter control circuit 53v is coupled to scroll control circuit 56 for receiving a scroll control signal therefrom. The vertical counter control circuit responds to this scroll control signal to vary the vertical absolute position count that is detected for presetting vertical address counter 55v or, alternatively, to vary the count to which the vertical address counter is preset. As a result, the period during which the vertical address count remains within an address range defining the vertical image dimension changes; and this produces a vertical scrolling effect to the graphic title image data read from memory 13 and passed by gate circuit 51.

Scroll control circuit 56 is coupled to a horizontal scroll input terminal 90h which is adapted to be supplied with a reference signal, such as ground potential, when switch 33h is closed. In response to the closure of switch 33h, the scroll control circuit supplies a horizontal scroll control signal to horizontal counter control circuit 53h. As mentioned above, this initiates and enables a horizontal scroll operation.

The scroll control circuit also is coupled to a vertical scroll input terminal 90v which is supplied with a reference signal when switch 33v is closed. Scroll control circuit 56 is adapted to respond to this signal to supply a vertical scroll control signal to vertical counter control circuit 53v, thereby initiating and enabling a vertical scroll operation. The scroll control circuit also is coupled to horizontal and vertical image range defining circuits 54h and 54v to receive the gate enabling signals produced thereby. It will be appreciated that these enabling signals define the horizontal and vertical range within the effective image plane, or picture area, over which graphic title image data is read from memory 13 and gated by gate circuit 51.

Switch 34 is adapted, when closed, to provide a control signal to red control input terminal 74, green control input terminal 75 or blue control input terminal 76. For example, in response to a first actuation of switch 34, a control signal is supplied to terminal 74. Upon the next actuation of switch 34, the control signal is shifted from terminal 74 to terminal 75. Thus, the control signal cycles from one of the red, green and blue control input terminals to the next as switch 34 is actuated.

Red control input terminal 74 is coupled to switch 77 and, in similar manner, green control input terminal 75 is coupled to switch 78 and blue control input terminal 76 is coupled to switch 79. One of switches 77, 78 and 79 is closed, depending upon which of the red, green and blue control input terminals is provided with a control signal. It is seen that switches 77, 78 and 79 are connected in common to the output of gate circuit 51, and each switch is coupled to a respective one of red output terminal 71, green output terminal 72 and blue output terminal 73, respectively. Each switch also is coupled to superimposed control signal generator 57 which, as an example, functions as an OR circuit to produce a blanking signal BLK coupled to output terminal 70. The red, green and blue output terminals 71, 72 and 73 are coupled to color signal modulators (not shown) for modulating the serial bits gated from shift register 50 with R, G and B color signals. Thus, the combination of switches 77–79 and output terminals 71–73, together with the color signal modulator circuits connected to those output terminals, function to convert the bits gated from shift register 50 to R, G, B color signals. As discussed above with respect to FIG. 2, these R, G, B color signals are supplied to converter 15 for conversion into luminance and color difference video signals. Thus, the graphic title image data gated from shift register 50 is converted to luminance and color difference video signals, compatible with the color video signals produced by image processing circuit 4 (FIG. 2).

Titler apparatus 12 also includes a write input terminal 91 and a read input terminal 92. Write switch 31 is coupled to write input terminal 91 and read switch 32 is coupled to read input terminal 92. In response to the actuation of write switch 31, a write enable circuit (not shown) coupled to write input terminal 91 supplies write enable signals to port 84 which, in turn, is coupled to the usual read/write control of memory 13. Similarly, when read switch 32 is closed, a read enable circuit (not shown) coupled to read input terminal 92 supplies read enable signals to port 84, thereby conditioning memory 13 for a read-out operation.

The titler apparatus also includes a power supply terminal 85 for receiving an operating potential, such as a positive potential, and a ground terminal 86 for receiving ground potential or an alternative reference voltage level.

Figure 4:
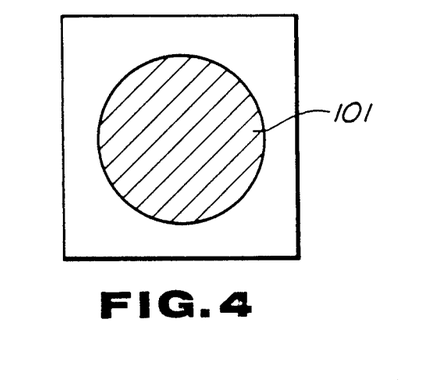
FIG. 4 is a diagrammatic representation of a graphic title image to be superimposed on an input video signal by use of the present invention.

The manner in which the illustrated titler apparatus operates now will be described. Initially, a graphic title image data write operation is carried out to store in memory 13 data representing graphic information, such as shown in FIG. 4. Let it be assumed that write switch 31 is closed, resulting in a write enable signal supplied to memory 13. Graphic image information picked up by CCD 1 (FIG. 2) results in an NTSC-encoded video signal having a luminance component supplied to A/D converter 11. The serial bits produced by the A/D converter are shifted into shift register 50. Although not shown, it is appreciated that the shift register is shifted at a rate determined by (or synchronized with) the clock signals supplied to clock input terminal 63. Furthermore, these clock signals are synchronized with the horizontal drive (or scanning) operation by which CCD 1 is scanned by CCD drive 3.

Figure 5:
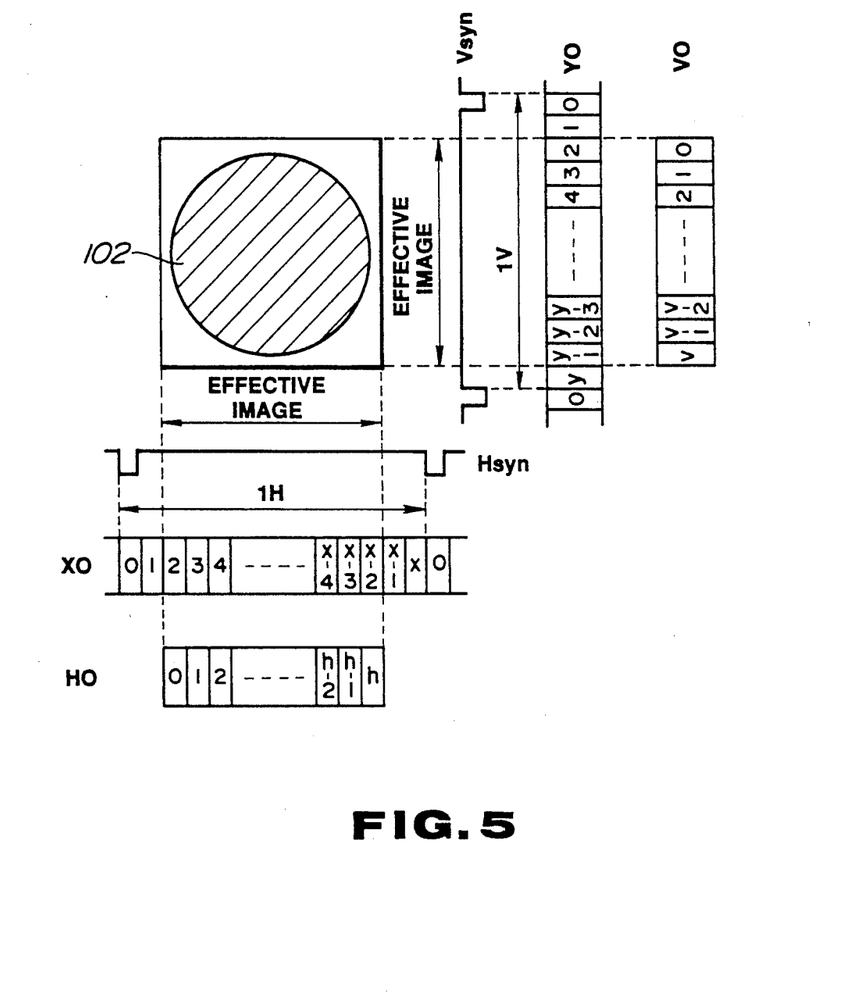
FIG. 5 is a diagrammatic representation which is useful in understanding the read/write operation used in the present invention.

As a line of imaging elements of CCD 1 is scanned, horizontal absolute position counter 52$h$ counts clock pulses to produce a count represented as count 0 in FIG. 5. It is appreciated that the count of counter 52$h$ represents absolute position between adjacent horizontal synchronizing signals. Thus, counter 52$h$ counts from a count of 0 to a maximum count x and is reset to a count of 0 in response to the next-occurring horizontal synchronizing signal.

During a write operation, a scroll control signal is not supplied to horizontal counter control circuit 53$h$. The counter control circuit detects when the absolute horizontal position count reaches a previously determined value which coincides with the beginning of the effective horizontal range included within the effective picture area. When this previously determined absolute horizontal position count is reached, counter control circuit 53$h$ resets horizontal address counter 55$h$, thereby permitting this counter to count the clock signal supplied to clock signal input terminal 63.

Horizontal address counter 55$h$ is incremented in synchronism with the shifting of bits into shift register 50. The count of the horizontal address counter is used as an address in which parallel bits in shift register 50 are written into and stored at memory 13. Thus, as the horizontal address count changes, the memory address likewise changes to define new storage locations in which the graphic title image data is stored.

Vertical absolute position counter 52$v$, vertical counter control circuit 53$v$ and vertical address counter 55$v$ function in a substantially similar manner, except that the vertical absolute position counter and the vertical address counter count horizontal synchronizing signals, and the vertical absolute position counter is reset in response to the vertical synchronizing signal. Nevertheless, when the absolute vertical position count reaches a previously determined value, counter control circuit 53$v$ resets vertical address counter 55$v$, thereby enabling the vertical address counter to count horizontal synchronizing signals. Each count of the vertical address counter serves as a new address for memory 13; and it is appreciated that, in one embodiment, memory 13 may be thought of as a matrix array with each storage location defined by a horizontal address and a vertical address. Thus, successive groups of serialized graphic title image bits are converted to parallel form and are stored at the address then defined by the counts of horizontal address counter 55$h$ and vertical address counter 55$v$.

FIG. 5 illustrates the manner in which counter control circuits 53$h$ and 53$v$ convert the horizontal and vertical absolute position counts to horizontal and vertical address counts which define the effective horizontal and vertical ranges of the picture area. Thus, horizontal address counts H0 from, for example, 0 to h, and vertical address counts V0 from, for example, 0 to v represent the effective image plane of the video signal. Preferably, the graphic title image data is stored only in those locations in memory 13 that are included within this effective image plane. As used herein, the horizontal image range includes horizontal counts 0 to h; and the vertical image range includes counts 0 to v.

A superposition operation of the graphic title image data thus stored in memory 13 now will be described. Let it be assumed that read switch 32 is closed, thereby supplying a read enable signal to the memory. As was carried out during the write operation, absolute position counters 52$h$ and 52$v$ are incremented from counts 0 to x and 0 to y, respectively, and address counters 55$h$ and 55$v$ are incremented from counts 0 to h and 0 to v, respectively, under the control of counter control circuits 53$h$ and 53$v$, respectively. Thus, as was done during the write operation, the horizontal and vertical address counters generate addresses within the horizontal and vertical image ranges, similar to the write addresses and are shown in FIG. 5.

As the memory address defined by the horizontal and vertical address counts H0 and V0 change, the graphic title image data stored in the addressed locations are transferred to port 81 and loaded in parallel into shift register 50. The shift register responds to clock pulses supplied thereto to shift the contents thereof serially to gate circuit 51. The successive reading of graphic title image data from memory 13 to shift register 50 and the shifting of the contents of the shift register through gate circuit 51 results in serial graphic title image data corresponding to graphic image 102 shown in FIG. 5. This figure represents the juxtaposition of the graphic image and the horizontal and vertical addresses generated by counters 55$h$ and 55$v$.

Horizontal image range defining circuit 54$h$ detects when the count of horizontal address counter 55$h$ is within the range 0 to h to supply an enabling signal to gate circuit 51. Similarly, vertical image range defining circuit 54v senses when the count of vertical address counter 55v is within the range 0 to v to supply an enabling signal to the gate circuit. When the horizontal and vertical gate enabling signals coincide, gate circuit 51 opens to pass the graphic title image data serially from shift register 50.

Depending upon which of switches 77, 78 and 79 is actuated, the passed graphic title image data is modulated with red, green or blue color signals and supplied from output terminals 71, 72 or 73 to converter 15 (FIG. 2). As mentioned above, the R, G, B graphic title image signals are converted by converter 15 to luminance and color difference signals that are supplied to superposition circuits 5, 6 and 7. It also is appreciated that superimpose control signal generator 57 responds to the graphic title image data passed by gate circuit 51 to supply a blanking signal BLK coincident with the graphic title image signals to the superposition circuits. When the blanking signal is received, the superposition circuits replace that portion of the video signal then being received from image processing circuit 4 (i.e. the video signal picked up by CCD 1) with the graphic title image video signals produced by converter 15. Thus, graphic title image information is superimposed onto the composite video signal then being produced by the video camera. Hence, a scene which is in the process of being imaged by CCD 1 has superimposed thereon graphic title image signals such that the video picture derived therefrom, as may be recorded by VTR 20, contains the superimposed graphic material.

In accordance with the present invention, the graphic title image signals superposed onto the picked up video signals (referred to as the input video signal) may be scrolled in the horizontal and vertical direction. That is, the relative position of the graphic title image signals superposed onto the input video signal may be shifted such that when a video picture thereof is displayed, the graphic material derived from the graphic title image signals appears to shift, or scroll, horizontally and vertically. Preferably, this horizontal movement is carried out in the right-to-left direction and the vertical movement is carried out from bottom-to-top of the video picture. Horizontal scrolling is achieved by closing switch 33h, and vertical scrolling is achieved by closing switch 33v. The manner in which such scrolling is carried out now will be described.

It is assumed that switch 32 is actuated to supply memory 13 with the read enable signal. Let it be further assumed that horizontal scroll switch 33h is actuated. Thus, scroll control circuit 56 supplies a signal to horizontal counter control circuit 53h to vary the absolute horizontal position count which is detected for resetting horizontal address counter 55h. The scroll control signal also is supplied to horizontal image range defining circuit 54h to enable this circuit to vary the beginning of the horizontal gate enabling signal produced thereby, yet permit the image range defining circuit to terminate that enabling signal when the count of horizontal absolute position counter 52h reaches the count corresponding to the end of the horizontal image range (represented in FIG. 5 as count x−2).

Figure 6:
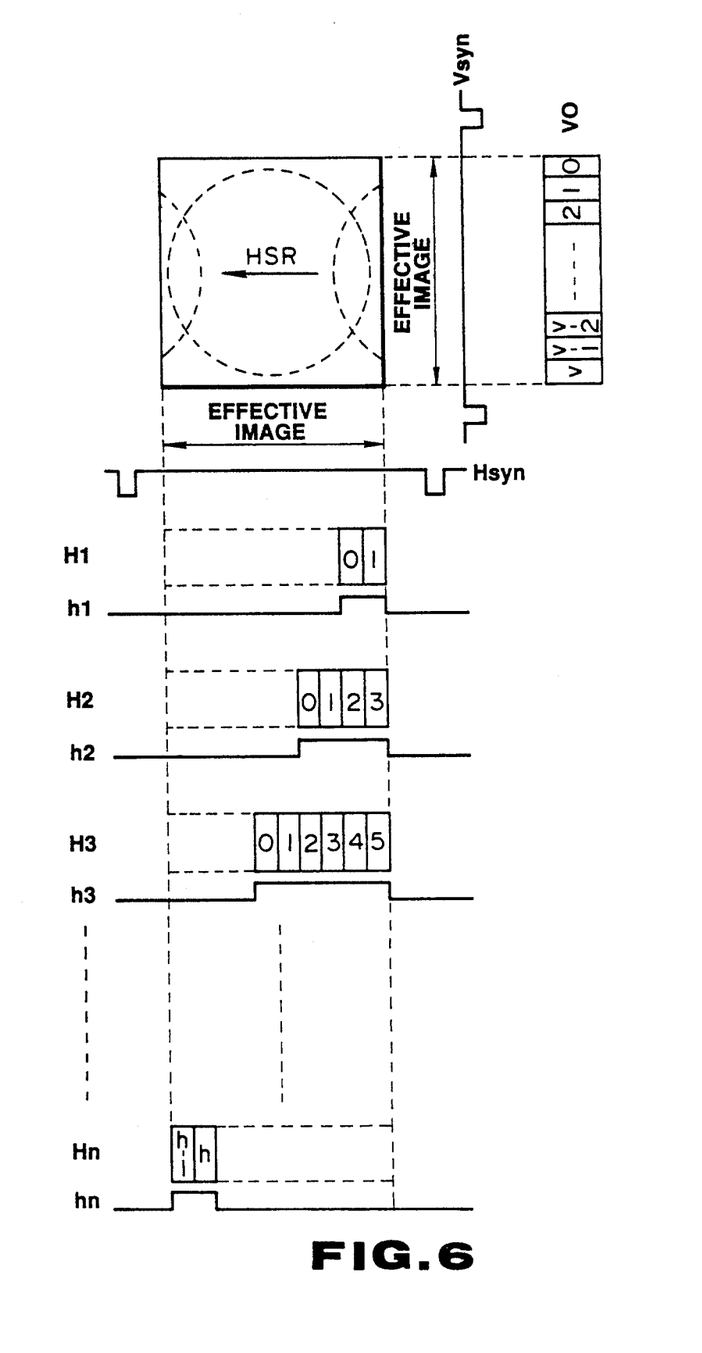
FIG. 6 is a diagrammatic representation useful in understanding how a horizontal scroll operation is achieved by the present invention.

Now, with reference to FIG. 6, if horizontal scroll switch 33h remains closed, the scroll control signal supplied to horizontal counter control circuit 53h by scroll control circuit 56 causes the counter control circuit to vary the absolute position address count that is detected and used to reset horizontal address counter 55h by a predetermined number of addresses every m frames. For example, during a particular frame, let it be assumed that counter control circuit 53h resets the horizontal address counter when the absolute horizontal position count is equal to (x−4). At that time, the horizontal address count is reset, as represented by counts H1 in FIG. 6, and horizontal image range defining circuit 54h commences the horizontal gate enabling pulse, as represented by pulse h1 in FIG. 6. Now, when the absolute horizontal position count reaches (x−1), the horizontal image range defining circuit terminates the horizontal gate enabling pulse h1, as shown. The graphic title image data stored at those memory locations addressed by horizontal address counts H1 are read therefrom, loaded into shift register 50 and then gated out of the shift register during the interval of the horizontal gate enabling pulse h1. The resultant graphic title image signals which are superimposed onto the input video signal produce an effective image of the type shown at the top of FIG. 6.

Now, m frames later, as may be determined by the counting of vertical synchronizing signals by horizontal counter control circuit 53h, the counter control circuit functions to detect when the absolute horizontal position count is equal to, for example, (x−6) to reset horizontal address counter 55h. As a result, horizontal address counts H2 are generated, resulting in horizontal gate enabling pulse h2. As before, the graphic title image data stored at memory locations addressed by horizontal address counts H2 are read therefrom, loaded into shift register 50 and gated out of the shift register by gate circuit 51 during the interval defined by horizontal gate enable pulse h2. It is appreciated that this shifting of the horizontal address counts H2 results in a right-to-left shift of the graphic title image information superimposed onto the input video signal and displayed as a video picture.

Next, m frames later, horizontal counter control circuit 53h detects when the absolute horizontal position count is equal to (x−8) to reset horizontal address counter 55h. Now, the horizontal address counts appear as counts H3, resulting in the horizontal gate enable pulse shown at h3. This provides a further right-to-left shifting in the graphic title image data read from memory 13 and superimposed by gate circuit 51, converter 15 (FIG. 2) and superimposition circuits 5, 6 and 7 on the input video signal. The graphic material displayed from the superposed graphic title image signals also appears to shift in the right-to-left direction.

The foregoing shifting in the absolute horizontal position count which is detected for resetting horizontal address counter 55h continues by, for example, two address counts (as discussed in the foregoing examples) every m frame. It is appreciated that this shifting may be any desired number of addresses and may be repeated at every m frames or at every m fields, wherein m is an integer. Such shifting in the absolute horizontal position count that is used to reset horizontal address counter 55h may be achieved by, for example, subtracting a desired count (which may vary every m frames or fields) from the absolute horizontal position count and then detecting when the difference count reaches the value which has been discussed above as the value representing the beginning of the horizontal image range. For example, if the absolute horizontal position count 2 (FIG. 5) represents the beginning of the horizontal image range, then by subtracting a desired count therefrom, the horizontal address count is not reset until the absolute horizontal position count has been incremented by that amount which has been subtracted. As shown in FIG. 6, when a large count value is subtracted, the horizontal address counter is reset close to the vicinity of the end of the horizontal image range. As this value is reduced, the resetting of the horizontal address counter shifts toward the beginning of the horizontal image range, as shown in FIG. 6.

To continue the right-to-left shifting of horizontal address counts relative to the absolute horizontal position count, thereby shifting the graphic title image data relative to the input video signal, once a zero-value count is subtracted from the absolute horizontal position count, the horizontal address counter thereafter may be preset to a positive address count other than 0 when a predetermined count of the absolute horizontal position count is detected. Accordingly, when the absolute horizontal position count reaches a count of 2 (which, as shown in FIG. 5, had been used previously to reset horizontal address counter 55$h$), the horizontal address counter now may be preset to a desired count. As a result of this presetting of the horizontal address counter, its count h is reached prior to the time that the absolute horizontal position count reaches the count of $(x-2)$. In FIG. 5, a horizontal address count h had been used to terminate the horizontal gate enable signal produced by horizontal image range defining circuit 54$h$. This same count h may be used to reset the horizontal gate enable signal; but now the resetting of that signal appears to shift in the right-to-left direction, as shown in FIG. 6. It is recognized that horizontal address counts Hn are preset to the count $(h-1)$ when the absolute horizontal position count reaches the count of 2, at which time the horizontal gate enable signal hn is initiated. Then, when the horizontal address count increments to the count of h, the horizontal gate enable signal terminates at the next clock pulse, as shown at hn in FIG. 6.

Therefore, it is recognized that the graphic title image signals, resulting in a graphic picture of the type shown at the top of FIG. 6, shifts in the horizontal direction, as represented by arrow HSR, when horizontal scroll switch 33$h$ is closed. This shifting changes by a predetermined amount (shown in FIG. 6 as equal to 2 horizontal address counts) every m fields or frames.

In the aforedescribed horizontal scrolling operation, it is assumed that vertical address counter 55$v$ generates vertical addresses from 0 to v through the effective vertical range of the video picture, discussed previously with respect to FIG. 5. Thus, FIG. 6 illustrates the vertical address counts V0 which are equal to those used during a graphic title image data write operation and also used during a non-scrolling graphic title image data superposition operation. That is, FIG. 6 has been discussed in the environment wherein there is no vertical scrolling of the graphic title image signals.

Figure 7:
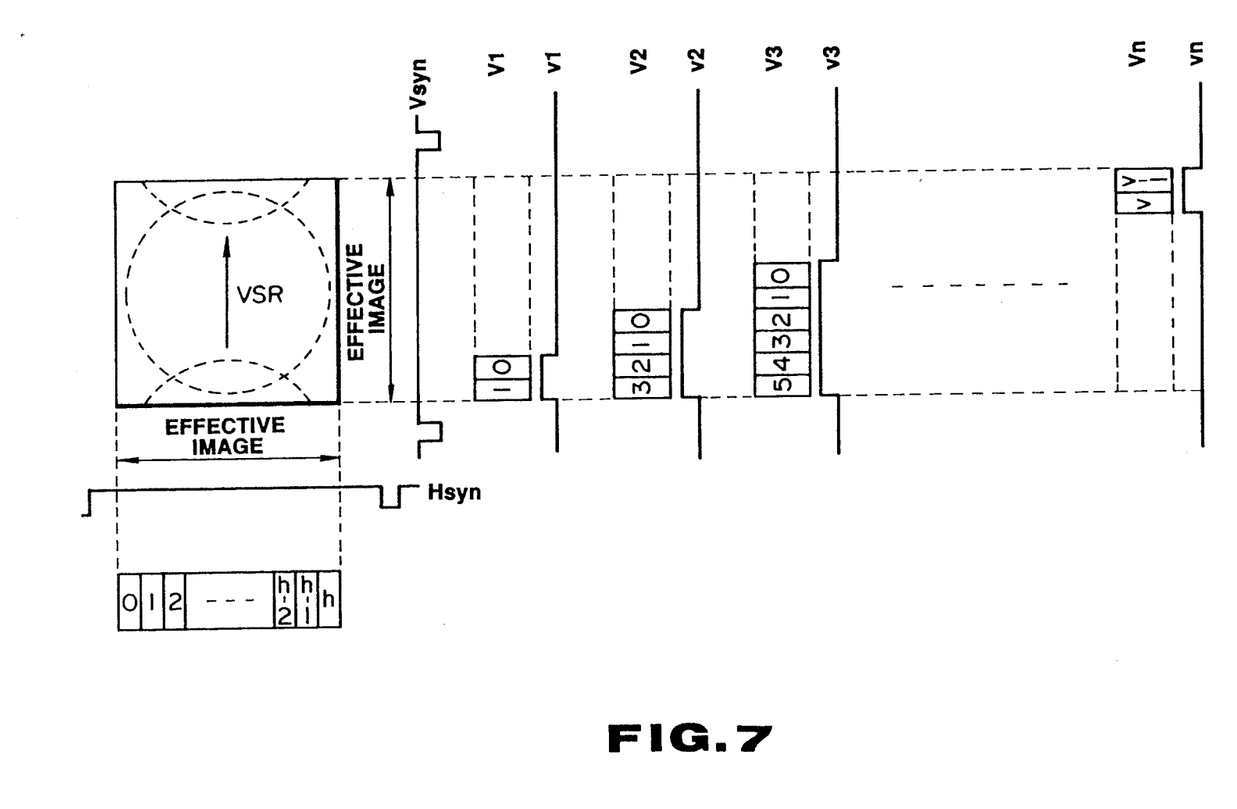
FIG. 7 is a diagrammatic representation useful in understanding how a vertical scroll operation is achieved by the present invention.

Let it now be assumed that vertical scroll switch 33$v$ is closed. As a result, scroll control circuit 56 supplies a scroll control signal to vertical counter control circuit 53$v$ and also to vertical image range defining circuit 54$v$. The vertical counter control circuit functions in a manner analogous to that of horizontal counter control circuit 53$h$ to detect the absolute vertical position count reached by vertical absolute position counter 52$v$ for the purpose of resetting vertical address counter 55$v$. FIG. 7 illustrates the manner in which the vertical address count is reset at different absolute vertical position counts, resulting in a shifting of vertical address counts V1, V2, V3, . . . Vn. When, for example, the vertical address count is reset, vertical image range defining circuit 54$v$ initiates the vertical gate enable signal, thereby shifting the time at which this enable signal begins, as depicted at v1, v2, v3, . . . vn in FIG. 7. Preferably, the vertical gate enable signal terminates either when the absolute vertical position count reaches a predetermined count, such as the count $(y-1)$ shown in FIG. 5, or when the vertical address count reaches the value v, as represented by vertical gate enable signal vn in FIG. 7.

The operation of titler apparatus 12 as represented by FIG. 7 results in a shifting of vertical address counts V by a predetermined amount, such as two counts, every m fields or frames. Consequently, the address locations of memory 13 which are read during each effective image interval appears to shift in the upward direction; and the graphic title image data read from the memory is gated out of shift register 50 during the interval determined by vertical gate enable signal v1 . . . vn. As a result, the graphic title image data appears to shift, or scroll, upwardly in the vertical direction, as represented by arrow VSR In FIG. 7.

It is apparent from FIG. 7 that the aforedescribed vertical scrolling operation is carried out without shifting the horizontal address counts If the horizontal addresses are shifted, as was described above with respect to FIG. 6, the resultant scrolling of the graphic title image signals superimposed onto the input video signal will appear as both vertical and horizontal movement of the graphic image signals.

Two alternate techniques now will be described for controlling the horizontal and vertical address counters to effect a scrolling operation. Since both counters may be controlled in substantially the same manner, for the purpose of simplification and convenience and in order to avoid duplicative explanation, the following description is directed to controlling vertical address counter 55$v$ Turning to FIG. 8, a diagrammatic representation is provided to illustrate that vertical counter control circuit 53$v$ detects when the absolute vertical position count reaches a previously determined value identifying the beginning, or top, of the vertical image plane to preset vertical address counter 55$v$ to a desired count. Counter 55$v$ then is incremented from its preset count until a predetermined address (such as address 0) is reached. At that time, vertical image range defining circuit 54$v$ responds to this predetermined address to initiate the vertical gate enable signal. This gate enable signal is terminated when the absolute vertical position count supplied to the vertical image range defining circuit reaches a desired count, such as count $(y-1)$.

Figure 8:
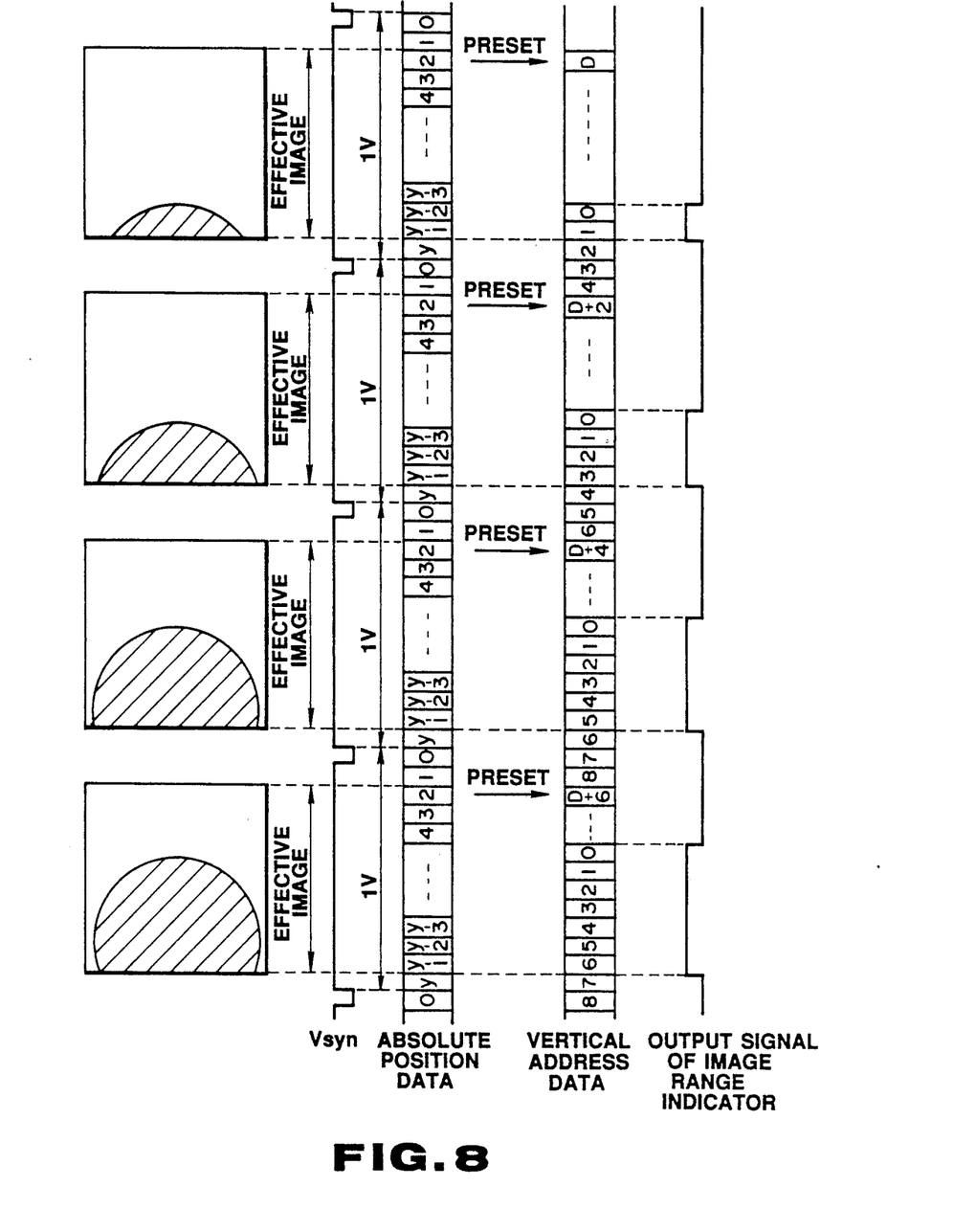
FIG. 8 is a diagrammatic representation useful in understanding how vertical addresses are controlled by the present invention to achieve a vertical scroll.

As also shown in FIG. 8, m frames (or fields) later, vertical counter control circuit 53$v$ presets vertical address counter 55$v$ to a different count at the beginning of the vertical image range, as represented by preset count $D+2$. With this different preset count, the vertical address count reaches the predetermined address 0 sooner than had been reached when the count had been preset to the count D. Thus, the vertical address counts appear to be shifted in the upward direction and, additionally, the vertical gate enable signal likewise appears to be enlarged upwardly from the bottom of the vertical image range.

FIG. 8 depicts this upward shifting in the vertical address counts as the vertical address counter is preset to different counts (D, $D+2$, $D+4$, $D+6$, etc.) every m frames (or fields). Thus, the graphic title image data read from memory 13 appears to be shifted in the upward direction; and the resultant video picture that is derived from this graphic title image data likewise appears to scroll upwardly across the picture area.

Figure 9:
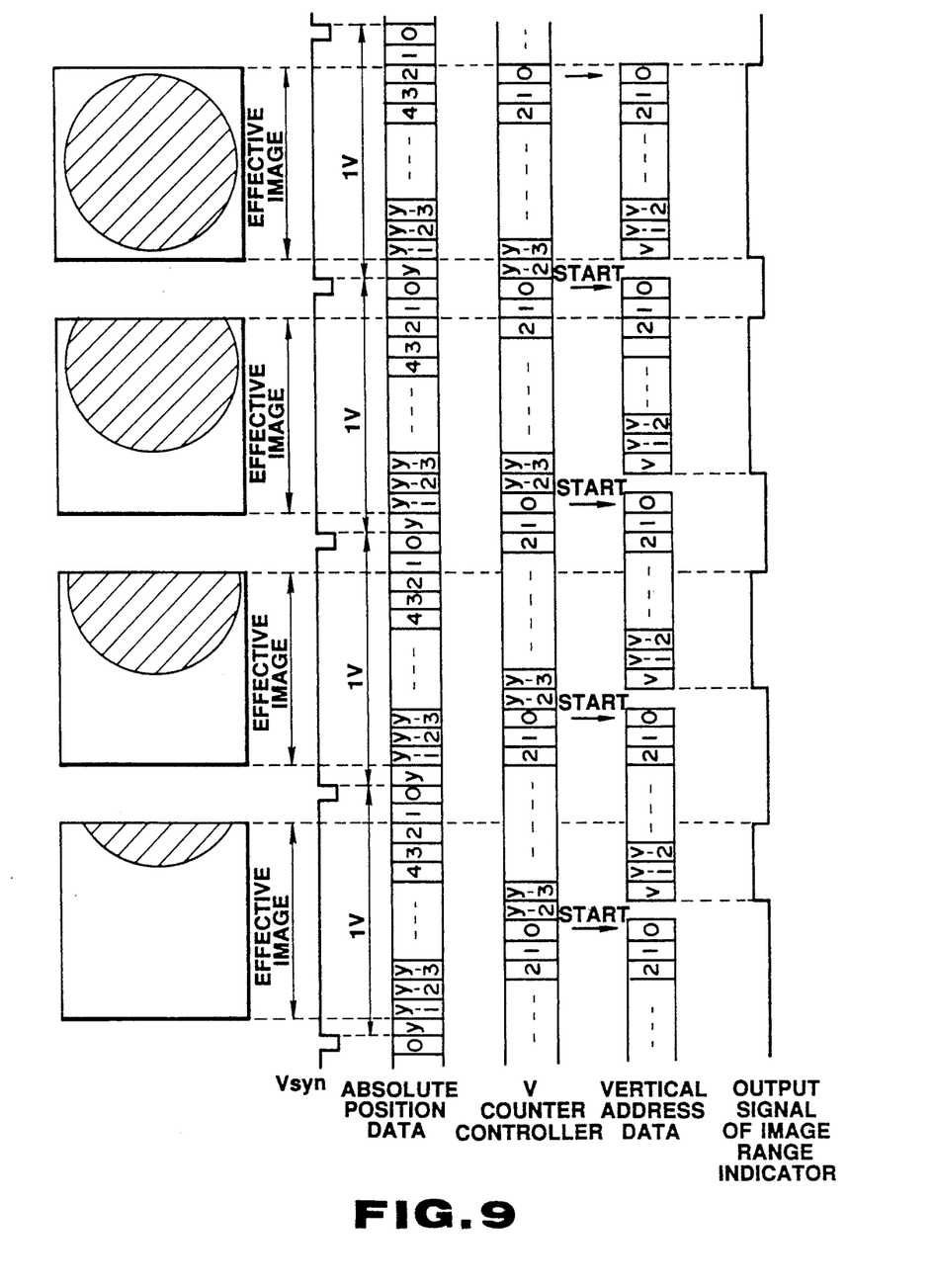
FIG. 9 is a diagrammatic representation providing further explanation of the manner in which a vertical scroll is achieved.

As an alternative address counter control operation, counter control circuit 53v resets vertical address counter 55v in response to different absolute vertical position counts, as shown in FIG. 9. In this alternative, vertical image range defining circuit 54v responds to a predetermined absolute vertical position count (such as count 2) to initiate the vertical gate enable signal, and then responds to the predetermined vertical address count (for example, count v) to terminate that signal. By changing the absolute vertical position count at which vertical address counter 55v is reset, the vertical address count appears to shift in the upward direction, as represented by FIG. 9. Vertical counter control circuit 53v may change the absolute vertical position count which is detected for resetting the vertical address counter every m frames (or fields). In FIG. 9, for convenience, m=1.

FIG. 9 illustrates, as one example, the resetting of vertical address counter 55v when the absolute vertical position count reaches a count of, for example, 2. The vertical gate enable signal produced by vertical image range defining circuit 54v is coextensive, at this time, with the effective vertical range. If, now, the vertical address counter is reset when the vertical absolute position count reaches a count of 0, the graphic title image data stored at locations corresponding to vertical addresses 2 to v are read out and gated through gate circuit 51.

It is seen that the vertical address counts continue to be shifted in what appears to be an upward direction, with a concomitant shifting in the vertical gate enable signal, as vertical counter control circuit 53v regresses the absolute vertical position count which is detected for resetting the vertical address counter.

From the foregoing, it is appreciated that the scroll rate, or speed at which the graphic title image information appears to move across the video picture area, is a function of the rate at which the horizontal and vertical address counts are shifted and the size of each shift. For example, if the address counts are shifted by one count every twenty frames, a relatively slow scrolling effect is achieved. This scrolling effect is accelerated if the address counts are changed by one count every frame, or by two counts every four frames, etc.

Preferably, the input video signal having the graphic title image signals superimposed thereon are supplied to view finder 40 by NTSC encoder 8 (FIG. 2). A user thus may observe the superposed graphic information and also be apprised of the particular color used to modulate that information. A change in color may be made by actuating switch 34, as discussed above. In the event that view finder 40 displays a monochrome video picture, a suitable color indication nevertheless may be displayed.

While the present invention has been particularly shown and described with reference to preferred embodiments, it will be readily appreciated by those of ordinary skill in the art that various changes may be made without departing from the spirit and scope of the invention. For example, the graphic title image data need not be derived solely by imaging a placard, as represented by FIG. 1. Rather, graphic video signals may be reproduced by a VTR (or the like) and supplied to A/D converter 11 (FIG. 2). Also, other techniques may be used to control the horizontal and vertical address counters so as to vary the interval during which gate circuit 51 is enabled. Likewise, the full contents of memory 13 may be loaded into shift register 50, but only a portion of the graphic title image data in the shift register may be gated out, depending upon the interval of the horizontal and vertical gate enable signals. The result still would achieve a horizontal and vertical scrolling effect of the type discussed above in conjunction with FIGS. 6-9.

It is intended that the appended claims be interpreted as including the foregoing as well as other equivalents to the present invention.

What is claimed is:

1. Apparatus for superimposing graphic title image signals onto an input video signal, comprising:
    addressable storage means for storing graphic title image data;
    address generating means for generating timed address signals to read out the graphic title image data from said storage means;
    image signal generating means for generating graphic title image signals from the graphic title image data read out from said storage means;
    superimposing means for receiving said input video signal and said graphic title image signals to superimpose said graphic title image signals onto said video signal;
    address control means coupled to said address generating means for establishing an effective image range of addresses;
    shift means for shifting the addresses of the address signals generated by said address generating means by a predetermined number of addresses for every m repetition periods, wherein m is an integer and a repetition period is a selected one of either a vertical field interval or a vertical frame interval of a video signal; and
    output means responsive to said effective image range of addresses and the shifted address signals to supply to said image signal generating means the read out graphic title image data from said storage means at intervals within said effective image range and determined by the shifted address signals, whereby a video picture derived from the supplied graphic title image data represents a graphic title image that shifts within said effective image range.

2. The apparatus of claim 1 further comprising data generating means for generating graphic title image data; and write means for writing the generated graphic title image data into said storage means.

3. The apparatus of claim 2 wherein said data generating means includes image pick-up means for picking up an image of graphic data and producing therefrom said graphic title image data.

4. The apparatus of claim 3 wherein said write means includes said address generating means for generating successive write address signals to write said graphic title image data into locations of said storage means addressed by said write address signals.

5. The apparatus of claim 1 wherein said address generating means includes horizontal and vertical address counting means reset by horizontal and vertical synchronizing signals, respectively; a source of horizontal and vertical synchronizing signals; and wherein said address control means includes horizontal and vertical counting control means coupled to said horizontal and vertical address counting means, respectively, for limiting the addresses produced by said horizontal and vertical address counting means to no greater than effective horizontal and vertical image ranges of addresses, respectively.

6. The apparatus of claim 5 further comprising a source of clock pulses; means for supplying said clock pulses to said horizontal address counting means for counting thereby, whereby said count represents a horizontal address; and means for supplying said horizontal synchronizing signals to said vertical address counting means for counting thereby, whereby the last-mentioned count represents a vertical address.

7. The apparatus of claim 6 further comprising horizontal and vertical absolute position counters for counting the clock and horizontal synchronizing signals, respectively, means for resetting the horizontal and vertical absolute position counters in response to the horizontal and vertical synchronizing signals, respectively; and wherein said horizontal and vertical counting control means enable said horizontal and vertical address counting means when the counts of said horizontal and vertical absolute position counters are in predetermined ranges, respectively.

8. The apparatus of claim 6 wherein said output means comprises gate means; horizontal gate enabling means for supplying a horizontal gate enabling signal to said gate means when the address of said horizontal address counting means is within said effective range; vertical gate enabling means for supplying a vertical gate enabling signal to said gate means when the address of said vertical address counting means is within said effective range; register means coupled to said storage means to receive the graphic title image data read out from said storage means and to supply said graphic title image data to said gate means to pass therethrough when said gate means is enabled by said horizontal and vertical gate enabling signals; and color selecting means operable to select color modulating signals for modulating the graphic title image data passed by said gate means.

9. The apparatus of claim 8 wherein said color selecting means includes switch means, and primary color signal generating means; said switch means being selectively operable to supply the graphic title image data passed by said gate means to at least a selected one of said color signal generating means for producing a corresponding color graphic title image signal.

10. The apparatus of claim 8 wherein said image signal generating means comprises converting means coupled to said color selecting means for converting the color modulated graphic title image data to luminance and color difference video signals.

11. The apparatus of claim 10 wherein said superimposing means comprises a superimpose control signal generator for generating a superimpose control signal when graphic title image data is passed by said gate means; and plural superimposing means each supplied with a respective luminance or color difference component of said input video signal and with a respective luminance or color difference video signal produced by said converting means and responsive to said superimpose control signal to substitute the luminance and color difference video signals from said converting means for the luminance and color difference components of said input video signal.

12. The apparatus of claim 11 wherein said input video signal is produced by a video camera.

13. The apparatus of claim 12 wherein said video camera includes CCD image pick-up means for generating said input video signal.

14. The apparatus of claim 11 wherein said shift means includes scroll means selectively operative to supply horizontal scroll signals to said horizontal counting control means for shifting the count of said horizontal address counting means and thereby scroll the graphic title image horizontally in the video picture.

15. The apparatus of claim 14 wherein said horizontal address counting means normally is reset to a predetermined address to establish the beginning of the effective image range in the horizontal direction; and wherein said horizontal counting control means is responsive to a horizontal scroll signal to preset said horizontal address counting means to a shifted address, whereby said predetermined address is produced at a location shifted from the beginning and within said effective image range.

16. The apparatus of claim 11 wherein said shift means includes scroll means selectively operative to supply vertical scroll signals to said vertical counting control means for shifting the count of said vertical address counting means and thereby scroll the graphic title image vertically in the video picture.

17. The apparatus of claim 16 wherein said vertical address counting means normally is reset to a predetermined address to establish the beginning of the effective image range in the vertical direction; and wherein said vertical counting control means is responsive to a vertical scroll signal to preset said vertical address counting means to a shifted address, whereby said predetermined address is produced at a location shifted from the beginning and within said effective image range.

18. The apparatus of claim 14 wherein said address control means further includes horizontal absolute position counting means reset by said horizontal synchronizing signal for counting said clock pulses to produce a count representing absolute horizontal position, a predetermined absolute horizontal position count establishing the beginning of the effective image range in the horizontal direction; said horizontal address counting means normally being reset in response to said predetermined absolute horizontal position count and reaching a predetermined address to establish the end of said effective image range in the horizontal direction; and said horizontal counting control means being responsive to a horizontal scroll signal to reset said horizontal address counting means in response to a shifted absolute horizontal position count, whereby said predetermined address is produced at a location shifted from the end and within said effective image range.

19. The apparatus of claim 17 wherein said address control means further includes vertical absolute position counting means reset by said vertical synchronizing signal for counting said horizontal synchronizing signals to produce a count representing absolute vertical position, a predetermined absolute vertical position count establishing the beginning of the effective image range in the vertical direction; said vertical address counting means normally being reset in response to said predetermined absolute vertical position count and reaching a predetermined address to establish the end of said effective image range in the vertical direction; and said vertical counting control means being responsive to a vertical scroll signal to reset said vertical address counting means in response to a shifted absolute position count, whereby said predetermined address is produced at a location shifted from the end and within said effective image range.

20. The apparatus of claim 1 wherein m=1.

21. The apparatus of claim 1 further comprising a main power source, and wherein said storage means comprises a static RAM and a power supply coupled thereto for preserving the contents stored therein when main power from said power source is interrupted.

22. Apparatus for superimposing graphic title image signals onto an input video signal, comprising:
a source of graphic title image data;
an addressable memory for storing horizontal line intervals of graphic title image data;
plural switches selectively operable for performing a write operation to write line intervals of graphic title image data into said memory, a superimposing operation to superimpose graphic title image signals onto said input video signal, and a scroll operation to scroll the graphic title image signals relative to said input video signal such that said image scrolls across an image plane;
counting means reset at the beginning of a video scan interval for generating counts in synchronism with horizontal line intervals to represent successive horizontal and vertical positions of a video image plane;
write means operable during a write operation for writing graphic title image data into selected addresses of said memory determined by the count of said counting means and defining an effective image plane;
read means operable during a superimposing operation to read graphic title image data from selected addresses of said memory determined by the count of said counting means;
address control means for selectively shifting the count of said counting means to correspondingly shift the addresses from which graphic title image data is read relative to the effective image plane;
scroll means operable during a scroll operation for causing said address control means to shift the count of said counting means by a predetermined count for every m video field interval, where m is an integer; and
gate means enabled during said effective image plane and responsive to the count of said counting means for passing the graphic title image data read from said memory.

23. The apparatus of claim 22 further comprising a source of horizontal sync signals, vertical sync signals and clock signals; and wherein said counting means comprises a horizontal counter reset in response to each horizontal sync signal for counting said clock signals to produce a count representing horizontal position of a horizontal line interval, and a vertical counter reset in response to each vertical sync signal for counting said horizontal sync signals to produce a count representing vertical position of a video field interval.

24. The apparatus of claim 23 wherein said counting means further comprises horizontal counter control means for establishing the counts of said horizontal counter to positions within an effective horizontal image range, and vertical counter control means for establishing the counts of said vertical counter to positions within an effective vertical image range.

25. The apparatus of claim 24 wherein said plural switches include a horizontal scroll switch for controlling said scroll means to cause said horizontal counter control means to preset said horizontal counter to a different shifted count at the beginning of said effective horizontal image range at each m-th field to impart a horizontal scroll to the graphic title image data across the image plane, and a vertical scroll switch for controlling said scroll means to cause said vertical counter control means to preset said vertical counter to a different shifted count at the beginning of said effective vertical image range at each m-th field to impart a vertical scroll to the graphic title image data across the image plane.

26. The apparatus of claim 22 further comprising color selecting means operable to select desired color signals for modulating the graphic title image data passed by said gate means.

27. The apparatus of claim 26 wherein said color selecting means produces R, G, B graphic title image signals; and further including converting means for converting said R, G, B signals to luminance and color difference signals, and superimposing means for receiving said luminance and color difference signals and said input video signal for replacing portions of said input video signal with said luminance and color difference signals.

28. The apparatus of claim 22 wherein said source of graphic title image data comprises video image pick-up means for imaging a graphic title image scene, and quantizing means for serially quantizing the output of said video image pick-up means; and further including a shift register for receiving the serially quantized graphic title image data and supplying parallel data to said write means, said shift register receiving parallel data from said read means and coupled to said gate means for supplying serial data thereto.

* * * * *